(12) United States Patent
Arisaka et al.

(10) Patent No.: US 6,324,732 B1
(45) Date of Patent: Dec. 4, 2001

(54) FASTENING STRUCTURE FOR FIXING AN ARTICLE ON BOARD VIA THROUGH-HOLE, AND HOLDER WITH FASTENING STRUCTURE

(75) Inventors: Oomi Arisaka; Shigeo Okada, both of Yokohama (JP)

(73) Assignee: Piolax, Inc, Kanagawa (JP)

( * ) Notice: Subject to any disclaimer, the term of this patent is extended or adjusted under 35 U.S.C. 154(b) by 0 days.

(21) Appl. No.: 09/556,144

(22) Filed: Apr. 21, 2000

(30) Foreign Application Priority Data

Apr. 23, 1999 (JP) .................................................. 11-117084

(51) Int. Cl.[7] .......................... A44B 17/00; A44B 21/00; B60J 3/02
(52) U.S. Cl. ................................. 24/458; 24/453; 24/523; 296/97.9; 248/222.1
(58) Field of Search ............................. 24/458, 523, 453; 296/97.9; 248/222.1; 403/326

(56) References Cited

U.S. PATENT DOCUMENTS

| | | | | |
|---|---|---|---|---|
| 4,840,334 | * | 6/1989 | Kikuchi .................................. | 24/453 |
| 5,411,310 | * | 5/1995 | Viertel et al. ........................ | 296/97.9 |
| 5,507,545 | * | 4/1996 | Krysiak ................................ | 296/97.9 |
| 5,560,575 | * | 10/1996 | Krysiak ............................ | 248/222.12 |
| 5,826,312 | * | 10/1998 | Schroder et al. ...................... | 24/458 |
| 5,881,800 | * | 3/1999 | Chung ................................... | 24/458 |
| 6,196,756 | * | 3/2001 | Leverger ............................... | 403/326 |

FOREIGN PATENT DOCUMENTS 4110224   7/1992   (JP) .

* cited by examiner

Primary Examiner—Victor N. Sakran
(74) Attorney, Agent, or Firm—Howard & Howard

(57) ABSTRACT

A fastener for fixing an article on a board via a through-hole formed thereon has a base that has a top face, side faces opposed to each other, and a rear end. An opening having at least two opposing edges is formed in the base. A pair of first elastic stoppers stands upright from the top face of the base and positioned along the edges of the opening. Each of the first elastic stoppers has an inclined projection extending outward. A pair of second elastic stoppers stands upright from the top face of the base next to the first elastic stoppers. Each of the second elastic stoppers has a leg and a wing extending from the leg, the wings spreading outward so as not to be parallel to each other. A cover plate is attached to the rear end of the base in a pivotable manner, so that the cover plate swings between an open position and a closed position. An insertion is attached to and extends from the inner surface of the cover plate. When the cover plate is closed, the insertion is fit into the opening of the base and pushes at least the first elastic stoppers outward.

26 Claims, 19 Drawing Sheets

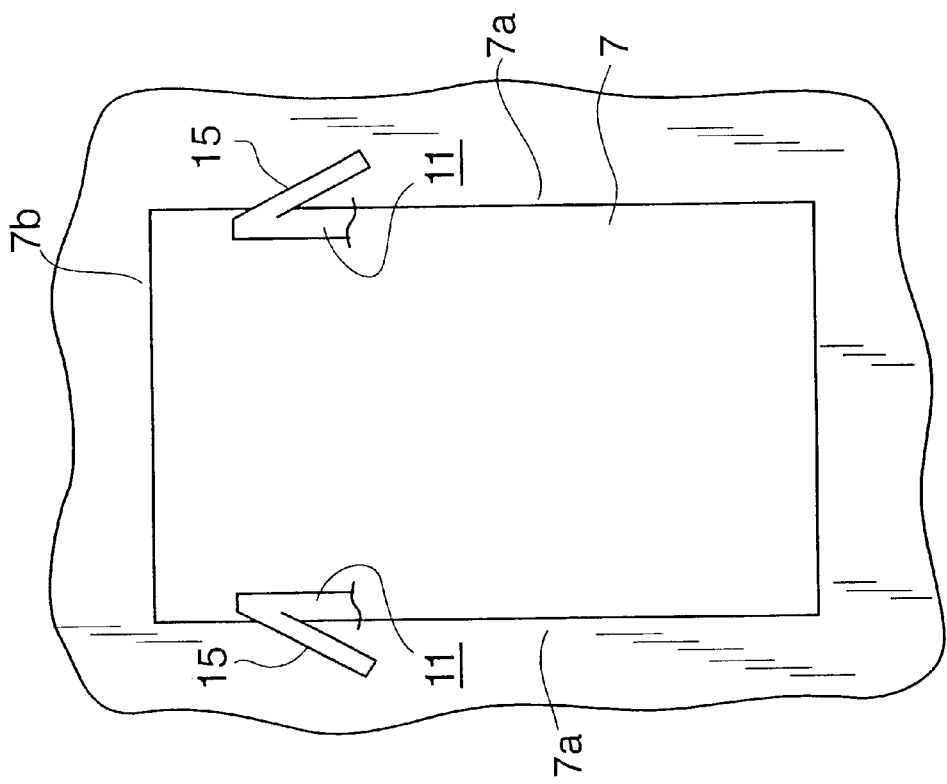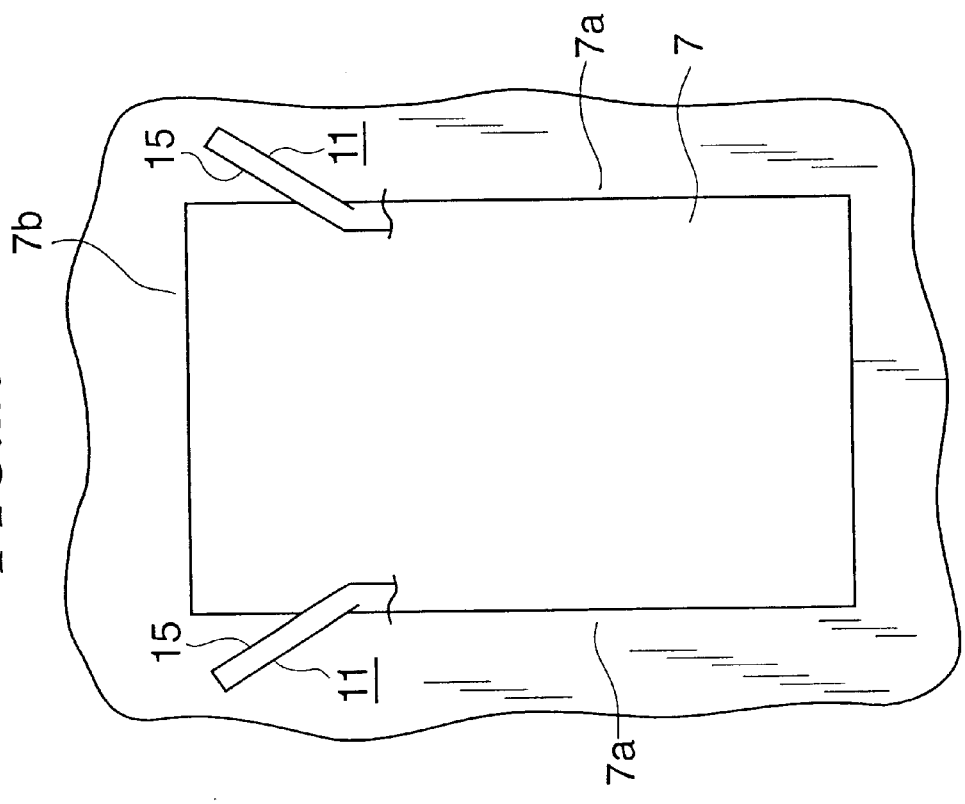

FASTENING STRUCTURE FOR FIXING AN ARTICLE ON BOARD VIA THROUGH-HOLE, AND HOLDER WITH FASTENING STRUCTURE

The present patent application claims the benefit of earlier Japanese Patent Application No. H11-117084 filed on Apr. 23, 1999, the disclosure of which is incorporated herein by reference.

BACKGROUND OF THE INVENTION

1. Field of the Invention

This invention relates to a fastening structure for fastening an article onto a wall, a panel board, or the like, via through-hole, in a detachable manner. The fastener is suitably applied to a holder for receiving a shaft of a sun visor used in an automobile, and to any other holders or retainers.

2. Description of the Related Art

In general, sun visors are furnished above the front sheets of an automobile in order to protect the driver's eyes and the passenger's eyes from the sun. The sun visor is generally attached to the upper front of the interior of the automobile to block the sunlight streaming into the car through the front glass. FIGS. 19 and 20 illustrate such sun visors furnished above the front sheets 22. The sun visor 1 has a pivoting shaft 24, which is retained by the retainer 25 fixed to the top front wall of the automobile C. The sun visor 1 swings about the pivoting shaft 24 between the home position (i.e., non-used position) and the light-blocking position (i.e., used position). The sun visor 1 also has a short shaft 26. When not in use, the sun visor 1 is rotated upward to the home position, and the short shaft 26 is received by the holder 27 so as to prevent the sun visor 1 from swinging downward.

The holder 27 is generally screwed onto the ceiling 23. However, screwing the holder 27 spoils the appearance of the interior of the car. In addition, the screw (or the vis) damages the lining and the ceiling 23. In order to overcome these problems, it was proposed to provide snappers to the holder 27. When the snappers are inserted into a through-hole, which is formed on the ceiling 23 of a car in advance, the snappers catch the edge of the through-hole, thereby securing the holder 27 onto the ceiling 23.

Japanese Patent Application Laid-open No. H4-110224 discloses such structure. In this publication, the base of the holder 27 has a projection for positioning itself, and two wavy snappers extend from the positioning projection in opposite directions. When the snappers and the projection are inserted into the through-hole formed on the ceiling 23, the two wavy snappers come into contact with the fold-back formed around the through-hole, whereby the holder 27 is attached to the ceiling 23. This structure does not spoil the appearance of the interior of a car, or damage the lining or the ceiling 23.

However, the structure disclosed in H4-110224 has some problems. The two wavy snappers are elastically deformed when they are inserted into the through-hole of the ceiling 23. After the snappers were inserted, they are spontaneously restored, and come into contact with the fold-back of the through-hole. In order to insert the snappers in the through-hole, a certain extent of force must be applied to the snappers to deform them. After the insertion, only elastic contact between the tip of the snapper and the fold-back of the through-hole supports the weight of the holder 27. This elastic contact may not be sufficient to securely support the holder 27 and the pivoting shaft of the sun visor for a long time, because the end portions of the snappers are in contact with the fold-back in the free states. Meanwhile, it is not easy to detach the holder 27 from the ceiling 23 because of difficulties to elastically deform the snappers, which are now positioned behind the ceiling, from the inside the car to pull them out of the through-hole. This inconvenience becomes conspicuous when the holder 27 needs to be repaired or changed.

SUMMARY OF THE INVENTION

Therefore, it is an object of the invention to overcome these problems in the prior art, and to provide a fastening structure, which allows an article to be fixed onto a wall securely with a little force, and to be easily detached from the wall as necessary.

It is another object of the invention to provide a holder with a fastening structure, which can be easily attached to and detached from a board, and which has an improved appearance.

It is another object of the invention to provide a roof lining with a holder, in which a holder and a lining are assembled into a single unit via a temporary, but reliable attachment.

To achieve the objects, in one aspect of the invention, a fastening structure for fixing an article onto a board via a through-hole is provided. The fastening structure includes a base having a top face, side faces opposed to each other, and a rear end. An opening that has at least two opposing edges is formed in the base. A pair of first elastic stoppers stands upright from the top face of the base and positioned along the edges of the opening. Each of the first elastic stoppers has an inclined projection extending outward. A pair of second elastic stoppers stands upright from the top face of the base and positioned next to the first elastic stoppers. Each of the second elastic stoppers has a leg and a wing extending from the leg. The wings spread outward so as not to be parallel to each other. A cover plate is attached to the rear end of the base in a pivotable manner, so that the cover plate swings between an open position and a closed position. An insertion extends from the inner surface of the cover plate. As the cover plate is closed, the insertion is going to fit into the opening of the base and pushes at least the first elastic stoppers outward (i.e., in a direction that the first elastic stoppers are apart from each other).

When the fastening structure is actually used to fix the article onto the board, the first and second elastic stoppers are elastically deformed, and inserted into the through-hole, with the cover plate open. Preferably, the second stoppers are more elastic than the first stoppers, so that the wings are easily inserted into and removed from the through-hole. In addition, the lap of the second elastic stopper is greater than that of the first elastic stopper. Accordingly, the inclined projections of the first elastic stoppers are in light contact with the edges of the through-hole, and the wings of the second elastic stoppers catch the edges of the through-hole more securely. This state is referred to as "temporary attachment".

To finally fix the article onto the board, the cover plate is closed. As the cover plate is closed, the insertion formed on the inner surface of the cover plate is going to fit into the opening of the base. When the insertion is completely fit into the opening, the outer surface of the insertion pushes at least the first elastic stoppers outward, which brings the inclined projections into firm contact with the edges of the through-hole formed on the board. This state is referred to as "final attachment".

Preferably, the insertion has contact pieces, and the contact pieces push the first elastic stoppers outward (i.e., in a direction that the first elastic stoppers are apart from each other) when the cover plate is closed.

The fastening structure may have an arched plate that connects the legs of the second elastic stoppers. The top of the arched plate is smoothly curved, so that it functions as a guide when the first and second elastic stoppers are inserted into the through-hole.

Preferably, the fastening structure further has a front stopper, which stands upright from the top face of the base. The front stopper is substantially perpendicular to the first and second elastic stoppers, so that the front stopper comes into contact with an edge of the through-hole on the board, the edge being perpendicular to the edges with which the first elastic stoppers are engaged. The front stopper prevents the fastening structure from moving along the longitudinal axis of the through-hole in the temporary attachment mode.

When removing the article from the board, the cover plate is opened to pull the insertion out of the opening. Then, the first elastic stoppers return to the free states, and the firm contact between the inclined projections and the edges of the through-hole is released (returning to the temporary attachment mode). By pivoting the fastening structure at the roots of the first and second elastic stoppers on one side of the opening, making use of the roots as fulcrums, the first and second elastic stoppers on the other side come out from through-hole.

The two-step attachment, i.e., the temporary attachment and the final attachment, allows easy attachment and detachment of the article. The user simply closes the cover plate to finally fix the article onto the board, and opens the cover plate to remove the article from the board.

One of the features of the fastening structure is that the first and second elastic stoppers stand upright in the free states. They do not have to be warped or bent in advance. This arrangement facilitates not only the insertion of the fastening structure into a through-hole, but also the manufacturing process itself.

In another aspect of the invention, a holder with a fastening structure is provided. The holder with a fastening structure has a base, which has a top face, side faces opposed to each other, and a rear end. A hook extends from the base, and curls in a direction opposite to the top face of the base. A cover plate is attached to the rear end of the base in a pivotable manner, so that it can swing between an open position and a closed position. An opening is formed in the base. A pair of first elastic stoppers stands upright from the top face of the base and positioned along the sides of the opening. Each of the first elastic stoppers has an inclined projection extending outward. A pair of second elastic stoppers stands upright from the top face of the base and positioned next to the first elastic stoppers. Each of the second elastic stoppers has a leg and a wing extending from the leg, the wings spreading outward so as not to be parallel to each other. An insertion extends from the inner surface of the cover plate. When the cover plate is closed, the insertion is fit into the opening of the base and pushes at least the first elastic stoppers outward when the cover plate is closed.

The cover plate is located behind the hook. When the cover plate is closed, the outer surface of the cover plate smoothly connects with the outer surface of the hook. This arrangement can improve the appearance of the holder in the actual use. Alternately, the cover plate may be located inside the hook. In this case, the outer surface of the cover plate smoothly connects with the inner surface of the hook when the cover plate is closed.

Preferably, the holder has a noise-absorption tongue that is provided onto the inner face of the hook. When the hook receives, for example, the shaft of a sun visor, uncomfortable noise is absorbed.

In still another aspect of the invention, a roof lining with a holder is provided. The roof lining with a holder includes a lining having a through-hole; and a holder attached to the lining via the through-hole. The holder has a fastening structure described above. The holder is attached to the lining with the cover plate open. In this state, while the inclined projections of the first elastic stoppers are in light contact with the edges of the through-hole formed in the lining, the wings of the second elastic stoppers catch the edges of the through-hole more securely (in the temporary attachment mode). Under this condition, the lining with a holder can be safely shipped or transported, without the holder coming off the through-hole, which meets with the needs for so-called modulization, in which the roof lining and the holder are assembled into a single unit.

In order to fix the lining with a holder to, for example, the ceiling panel of a car, the fastening structure of the holder is inserted in the through-hole, which was formed in the ceiling panel in advance. Then, the cover plate is simply closed, so that the insertion pushes the first elastic stoppers outward to bring them into firm contact with the edges of the through-hole of the ceiling panel.

BRIEF DESCRIPTION OF THE DRAWINGS

Other objects, features, and advantages of the invention will be apparent from the following detailed description in conjunction with the attached drawings, in which:

FIG. 5 illustrates the structure of holder, in which

FIG. 6 illustrates how the holder is supported on the roof lining 6, in which

FIG. 7 illustrates the structure of the insertion having contact projections, in which

FIG. 10 illustrates modifications of the wings of the second elastic stoppers in plane views, in which FIG. 10(A) shows the wings, each making an acute angle with respect to its leg, and FIG. 10(B) shows the wings, each making an obtuse angle with respect to its leg;

FIG. 11 illustrates the holder according to the second invention in perspective views, in which

FIG. 16 illustrates in left-side views how the holder temporarily attached to the roof lining is finally fixed to the panel board having a through-hole, in which

FIG. 17 illustrates how the elastic stoppers of the holder are inserted into the through-hole, in which

DETAILED DESCRIPTION OF THE INVENTION

<First Embodiment>

The invention will now be described in detail in conjunction with the attached drawings.

Figure 20:
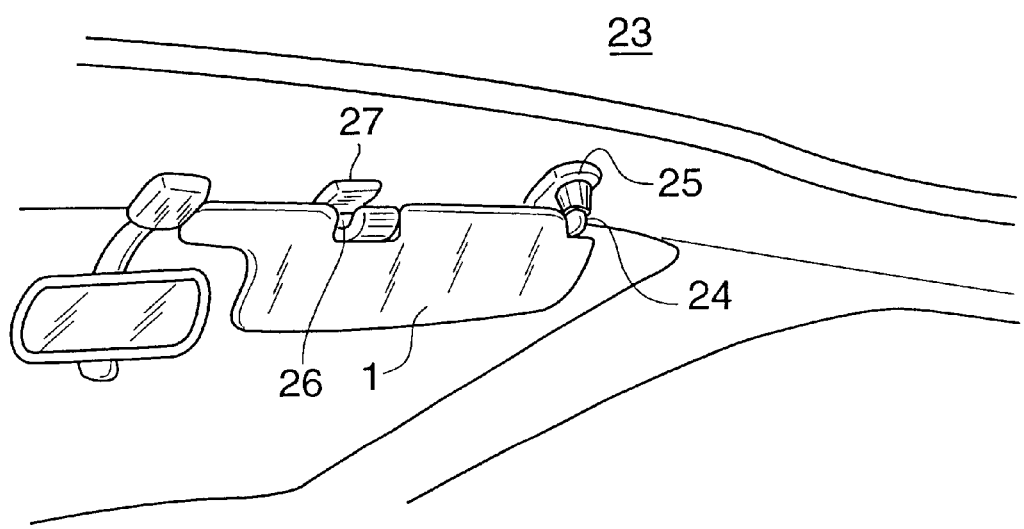
FIG. 20 is an enlarged view of the sun visor attached to the roof lining above the driver's sheet.

FIGS. 1 through 10 illustrate a holder with a fastener according to the first embodiment of the invention, which is suitably used to receive the shaft 26 of a sun visor (shown in FIG. 20) in an automobile. The fastener of this embodiment is inserted in a rectangular through-hole formed in the wall 39 to fix the holder 3 onto the wall 39. The wall 39 consists of the roof lining 6 and the panel board 38 in this embodiment. However, the fastener allows the holder 3 to be fixed to any types of boards, panels, and walls. In addition, the structure of the fastener of the holder 3 can be applied to many articles, including holders, retainers, hooks, etc.

In this embodiment, the holder 3 is made of a synthetic resin. The holder 3 has a base 8, a portion of which is shaped in a hook 13 for holding the shaft 26 of the sun visor 1. The hook 13 is curled in a direction opposite to the top face of the base 8, on which the fastener is formed. A rectangular opening 9 is formed in the center of the base 8. Recesses extend from the opposing edges 9a of the opening 9 toward the side faces of the base 8, so that each side face has an opening 21.

A pair of first elastic stoppers 10 stand upright from the top face of the base 8, along the opposing sides 9a of the opening 9. A pair of second elastic stoppers 11 stand upright from the top face of the base 8, adjacent to the first elastic stoppers. A front stopper 17 stands upright from the top face of the base 8 so as to be substantially perpendicular to the first and second elastic stoppers 10 and 11. The stoppers 10, 11, and 17 constitute a top portion of the fastener.

Figure 4:
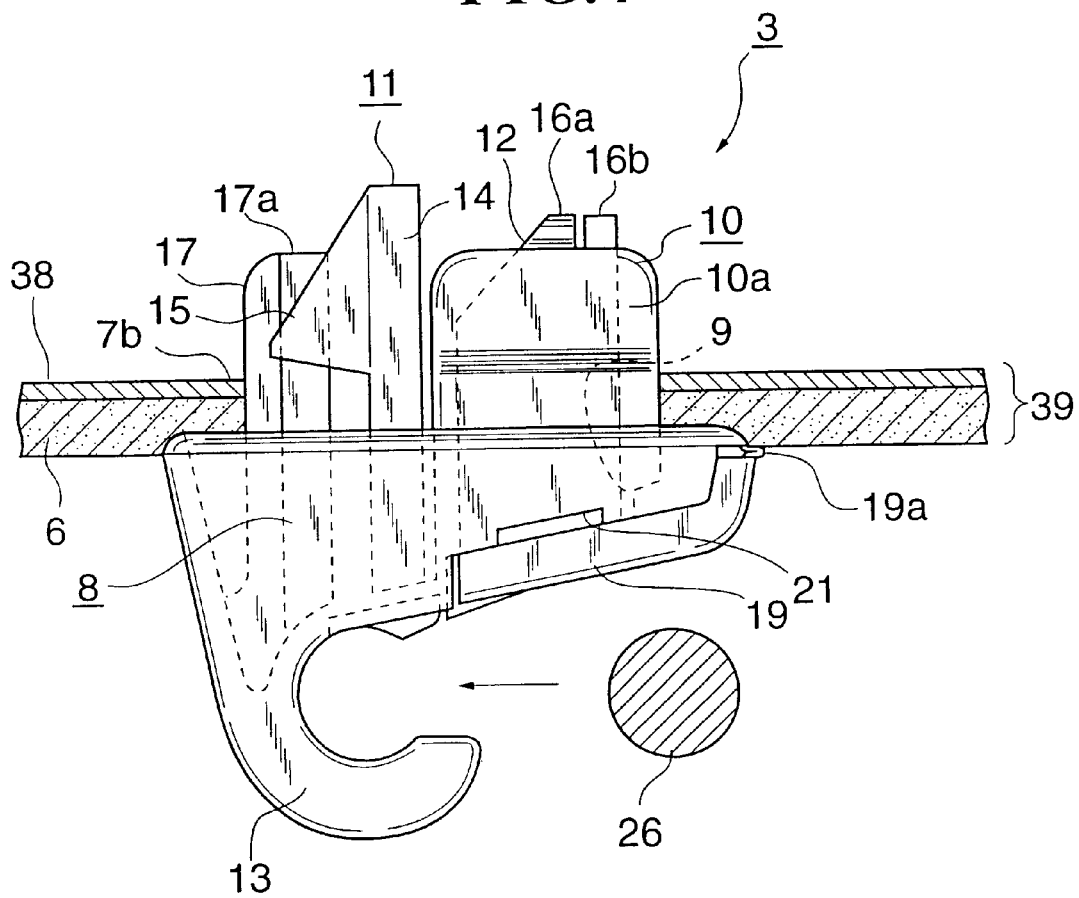
FIG. 4 illustrates the holder with the cover plate closed, which is now attached to the roof lining, in a side view.
Figure 8:
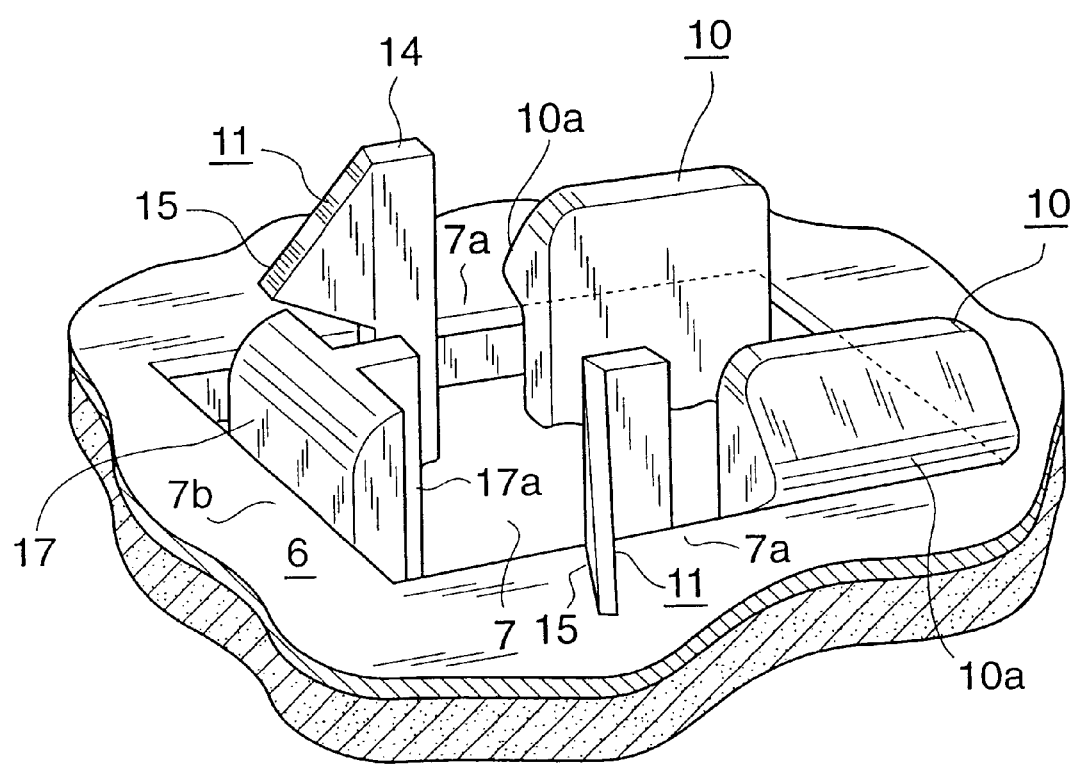
FIG. 8 illustrates how the elastic stoppers of the holder are engaged with the periphery of the through-hole.

Each of the first elastic stoppers 10 has an inclined projection 10a shaped in a prism extending outward. Each of the second elastic stoppers 11 has a triangular wing 15 spreading outward. As is illustrated in FIGS. 4, 6 and 8, the fastener of the holder 3 is inserted into a rectangular through-hole 7 formed in the wall 39. The through-hole 7 is defined by edges 7a and shorter edges 7b that are perpendicular to the edges 7a, as shown in FIG. 8. A portion of the bottom faces of the inclined projections 10a of the first elastic stoppers 10 catch the edges 7a of the through-hole 7. Since each projection 10 a is shaped in an arrow having an inclined surface, the first elastic stoppers 10 can be easily inserted into the through-hole 7. The user feels a click when the fastener has been completely inserted in the through-hole 7.

Figure 5A:
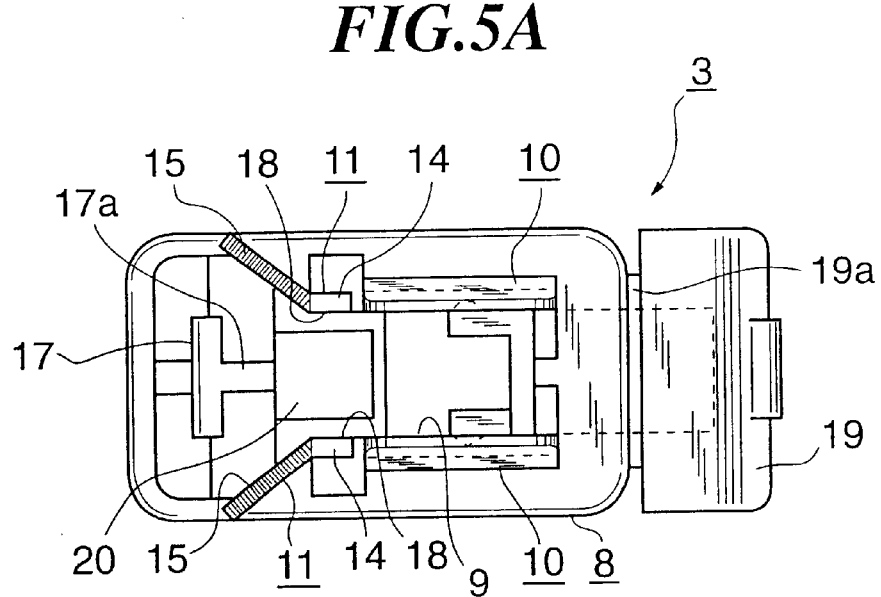
FIG. 5(A) is a plane view.
Figure 5B:
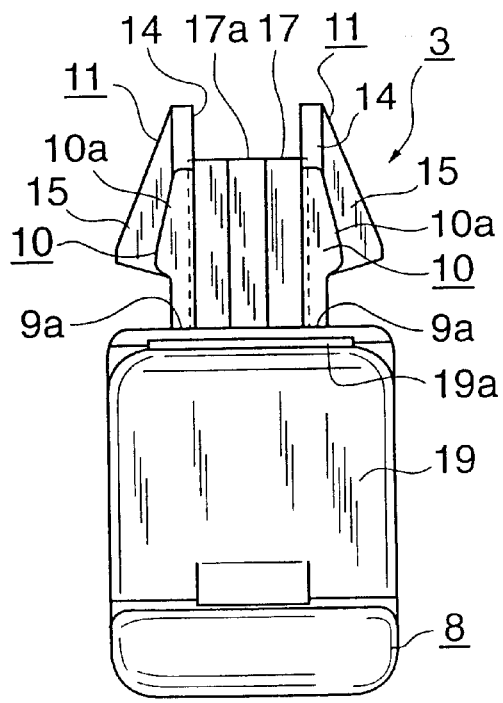
FIG. 5(B) is a front view.
Figure 5C:
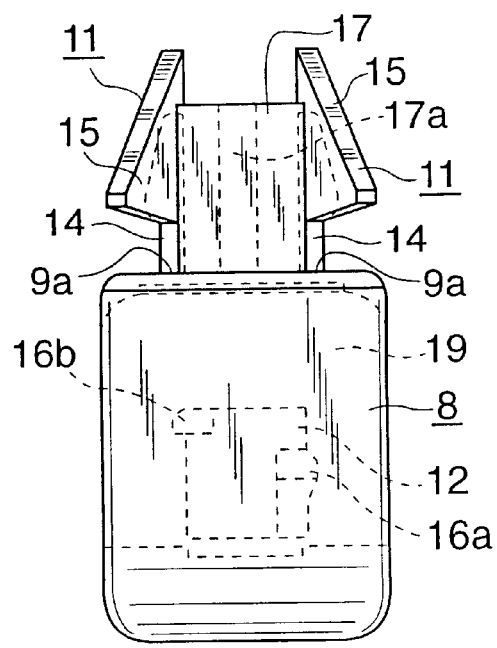
FIG. 5(C) is a rear view of the holder.
Figure 6A:
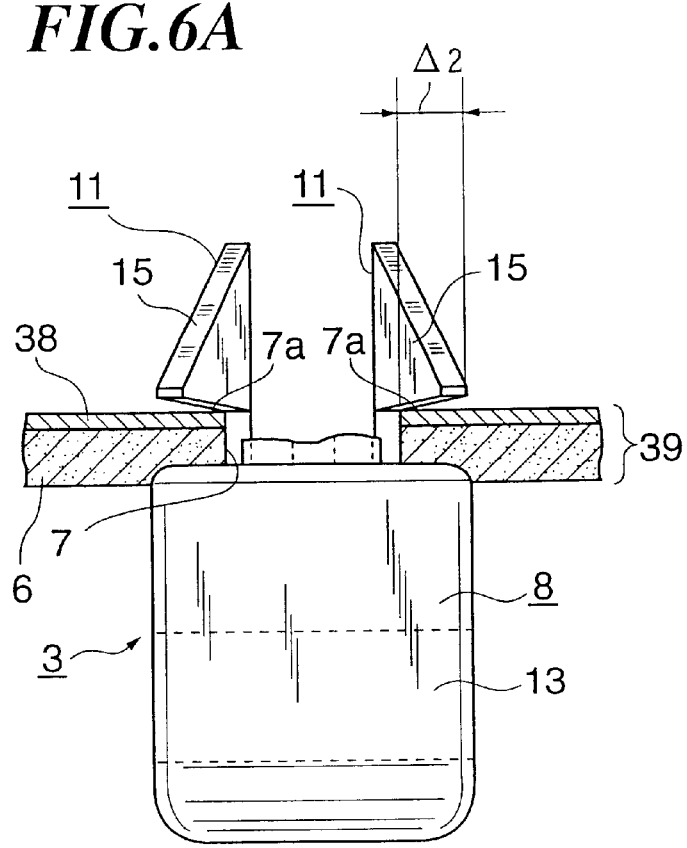
FIG. 6(A) shows the state of temporary attachment.

Each of the second elastic stoppers 11 has a leg 14 and a triangular wing 15 extending from the upper half of the leg 14. The wings 15 spread slightly outward from the opening 9. Accordingly, the wings 15 of the second elastic stoppers 11 are not parallel to each other, as clearly shown in FIGS. 5, 6, and 8. A portion of the bottom faces of the wings 15, which is near the roots of the wings 15, catch the edges 7a of the rectangular through-hole 7 behind the wall 39, as shown in FIGS. 6(A) and 8. Although in these figures the roof lining 6 and the panel board 38 are put together to form the wall 39, the roof lining 6 may be independently manufactured and sold. In this case, the holder 3 is temporarily attached to the roof lining 6 for shipping and transportation before the roof lining 6 and the holder 3 are finally fixed to the panel board 38. Because, in the temporary attachment, the wings 15 are engaged with the soft material, i.e., the roof lining 6, a sufficient amount of lap is taken for each wing 15.

In this embodiment, the bottom face of the wing 15 is slightly inclined upward as it approaches the vertex of the triangle. This configuration allows the wing 15 to absorb the unevenness of the edges 7a, which is inevitable due to manufacturing error. The inclined bottom face of the wing 15 also allows the second elastic stoppers 11 to be removed from the through-hole 7 without difficulty when the holder 3 is detached from the wall 39.

The amount of projection length $\Delta 2$, which is referred to as a lap corresponding to the distance from the edge 7a of the through-hole 7 to the vertex of the wing 15 of the second elastic stopper 11, is set greater, than the lap $\Delta 1$, which corresponds to the height of the inclined projection 10a of the first elastic stopper 10, as shown in FIG. 6 ($\Delta 2 > \Delta 1$). In addition, the inclined projection 10a of the first elastic stopper 10 is made thicker than the second elastic stopper 11, so that the rigidity of the first elastic stopper 10 becomes greater than that of the second elastic stopper 11. These arrangements allow the fastener of the holder 3 to be smoothly inserted in the through-hole 7, and to securely engage itself with the edges 7a of the through-hole 7 after the insertion. In addition, the slanted bottom faces of the inclined projection 10a and the wing 15 facilitate the removal of the holder 3 from the through-hole 7.

Figure 1:
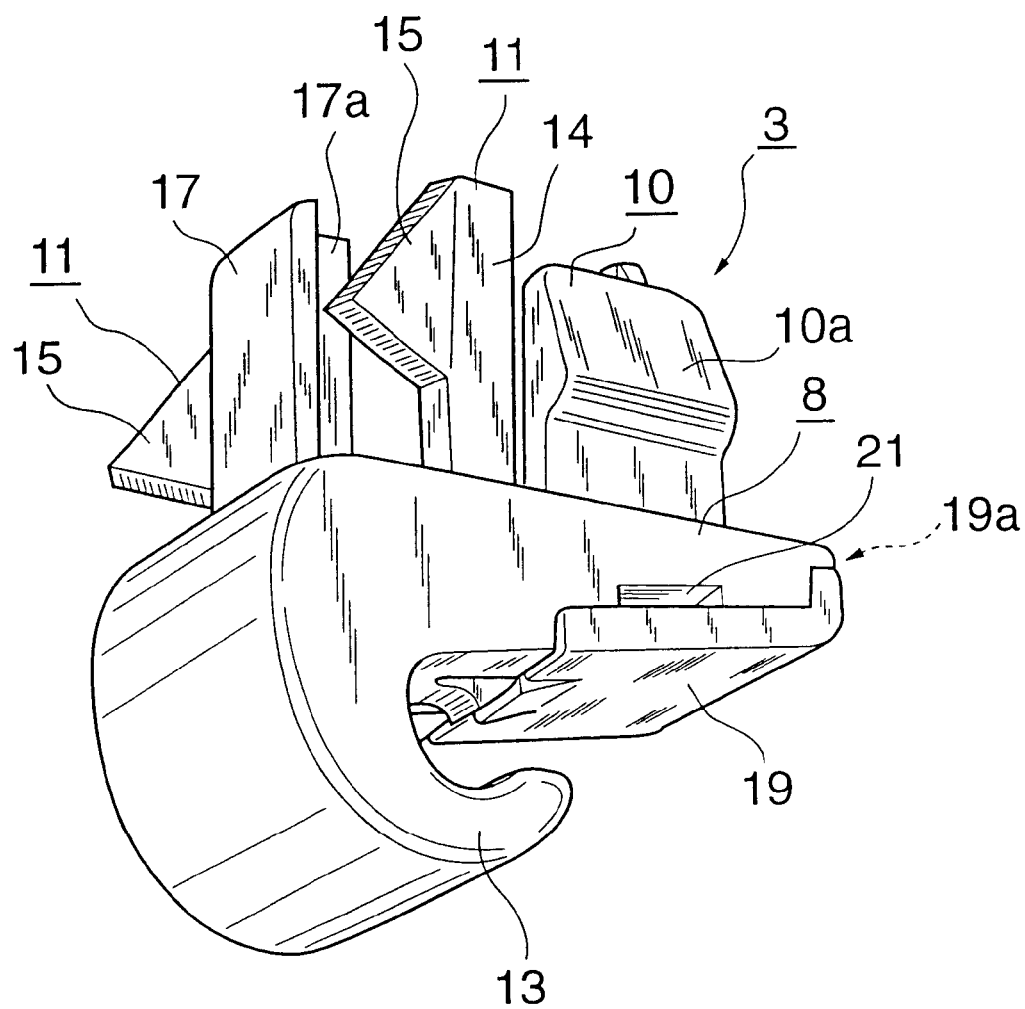
FIG. 1 is a perspective view of the holder according to the first embodiment of the invention.
Figure 2:
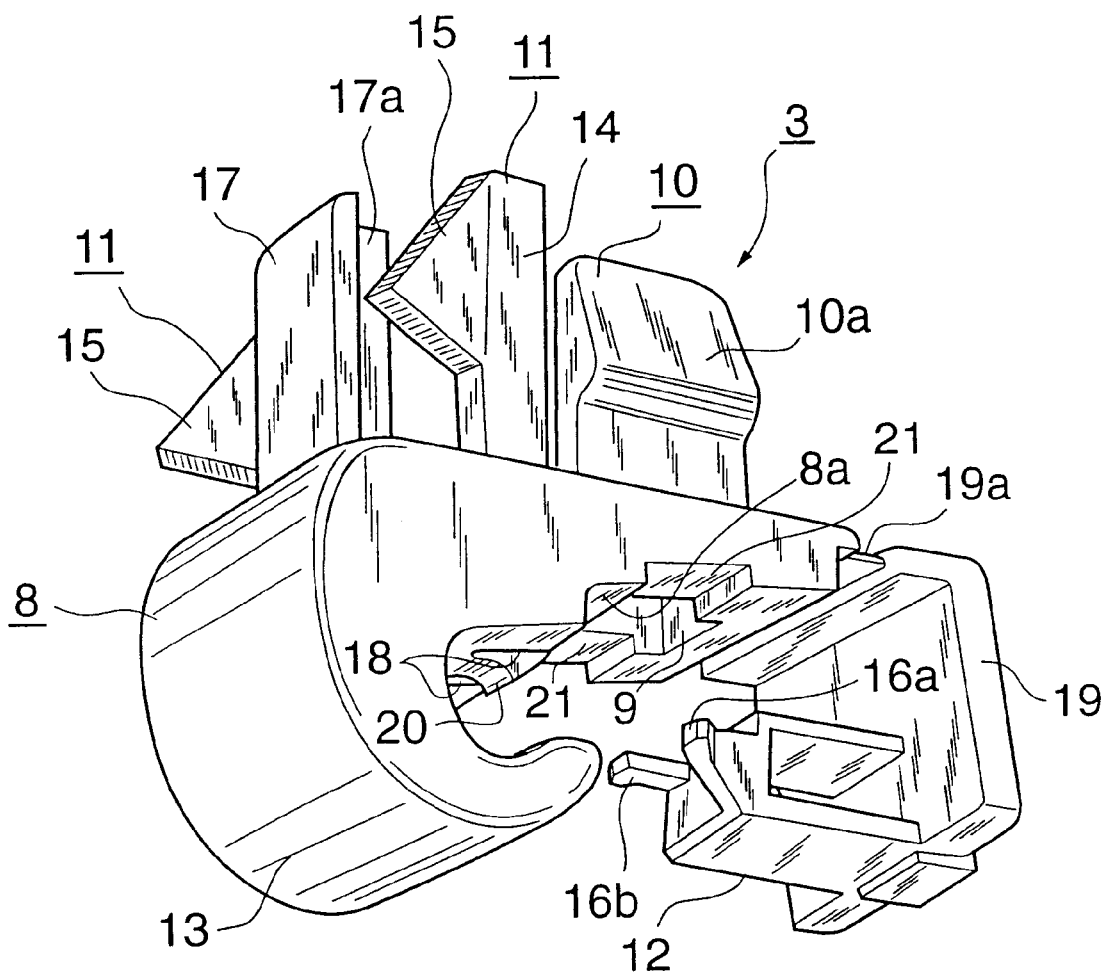
FIG. 2 illustrates the holder with the cover plate open, which is about to be attached to a roof lining in a perspective view.
Figure 3:
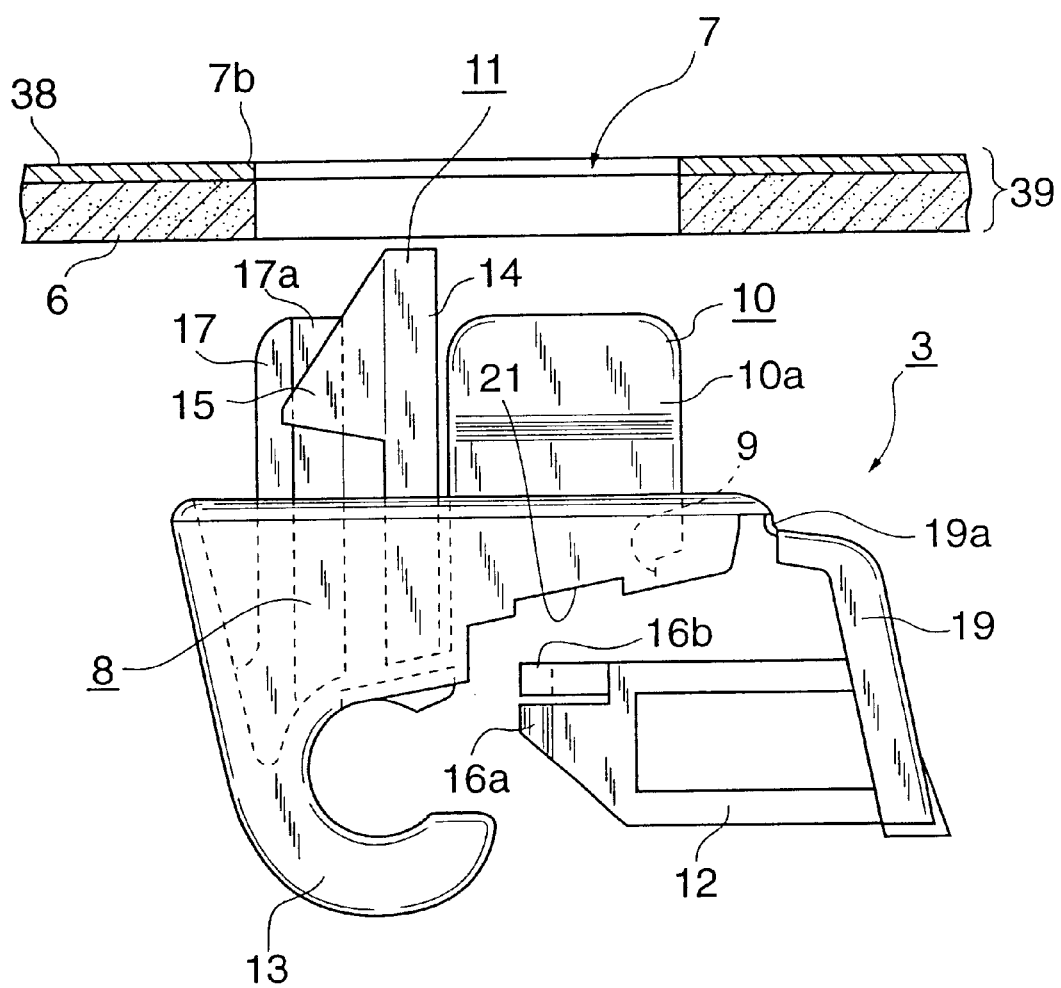
FIG. 3 illustrates the holder shown in FIG. 2 in a side view.

The base 8 of the holder 3 has a cover plate 19, which swings about the coupling axis 19a. FIGS. 1 and 4 illustrate the closed position of the cover plate 19. FIGS. 2 and 3 illustrate the open position of the cover plate 19. The coupling axis 19a is a thin bendable plate, and it functions both as a coupler and a hinge so that the cover plate 19 pivots about the coupling axis 19a. The inner face of the cover plate 19 is furnished with an insertion 12. As the cover plate 19 is closed, the top of the insertion 12 protrudes into the opening 9 formed in the base 8. When the cover plate 19 is completely closed, the insertion 12 is accommodated in the opening 9, as shown in FIG. 4. In this state, the outer faces of the insertion 12 push the rear faces of the first elastic stoppers 10, so that the inclined projections 10a are apart from each other. The outward displacement of the inclined projections 10a ensures firm contact with the edges 7a of the through-hole 7.

Figure 7A:
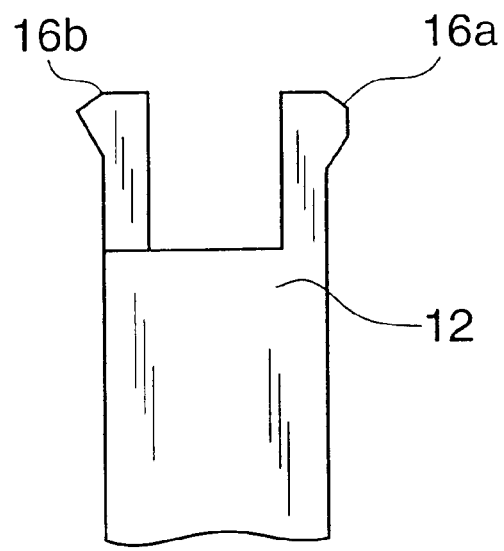
FIG. 7(A) is a front view.
Figure 7B:
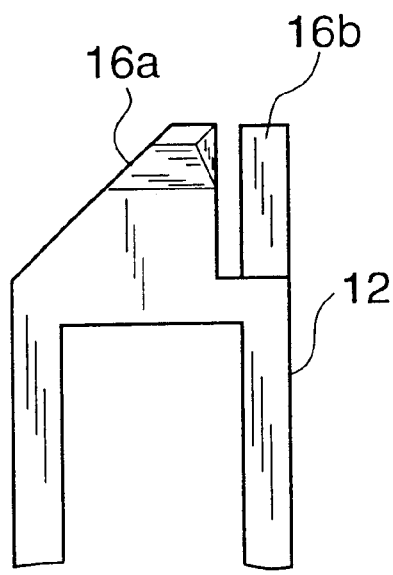
FIG. 7(B) is a right-side view.
Figure 7C:
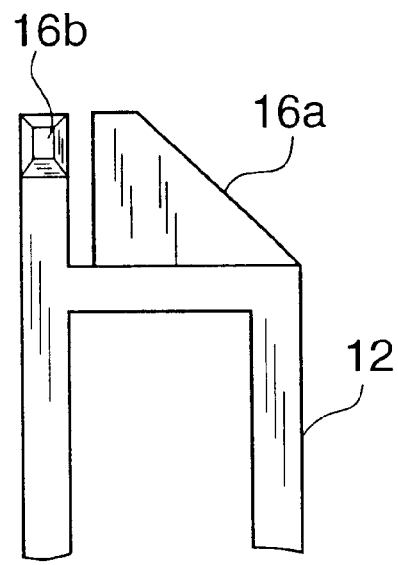
FIG. 7(C) is a left-side view.

To be more precise, contact pieces 16a and 16b stick out from the top of the insertion 12. Each contact piece 16 has a small swell outward, which is to be in contact with one of the first elastic stoppers 10. As shown in FIGS. 1 and 7, the contact pieces 16a and 16b are asymmetric, so that they come into contact with the first elastic stoppers 10 in turn at different positions. In this embodiment, the contact piece 16b first comes into contact with the associated first elastic stopper 10, and then, the contact piece 16a comes into contact with the other elastic stopper 10. This arrangement allows the insertion 12 to be fit into the opening 9 with less force.

The front stopper 17 is positioned above the hook 13 of the holder 3. During the insertion of the fastener, the front face of the front stopper 17 comes into contact with the edge 7b of the through-hole 7, which is substantially perpendicular to the edges 7a. The front stopper 17 has a rib 17a on the rear face, the rib 17a extends along the longitudinal axis of the front stopper 17, as shown in FIGS. 1, 2, and 5. The rib 17a enhances the front stopper 17. As is obvious from the drawings, the rib 17a of the front stopper 17 is positioned so as not to conflict with the wings 15 of the second elastic stoppers 11. The front stopper 17 prevents the holder 3 from moving toward the edge 7b of the through-hole 7 when a load is applied to the holder 13 during the pivoting motion of the sun visor about the shaft 24.

To temporarily attach the holder 3 to the wall 39, the first and second elastic stoppers 10 and 11 are elastically deformed inward and inserted into the through-hole 7, with the cover plate 19 open, as shown in FIG. 3. The bottom faces of the inclined projections 10a of the first elastic stoppers 10 are in light contact with the edges 7a of the through-hole 7, and the wings 15 of the second elastic stoppers 11 catch the edges 7a more securely. The front stopper 17 is in contact with the edge 7b of the through-hole 7. In this state, the holder 3 is supported in the through-hole 7 of the wall 39 mainly by four elements, namely, two first elastic stoppers 10 and two second elastic stoppers 11. The frictional contact between the front stopper 17 and the edge 7b also slightly contributes to supporting the holder 3.

As has been mentioned above, this arrangement is applicable to the roof lining 6 that is dealt separately from the panel board 39. In recent years, multiple elements are assembled into a single unit for purposes of reducing the manufacturing cost. It is very likely that the roof lining 6 and the holder 3 are assembled into a single unit, and the roof lining with a holder is shipped and transported. In this case, the temporary, but reliable attachment of the holder 3 to the roof lining 6 allows safe shipment. This feature meets with the needs for so-called modulization.

Figure 6B:
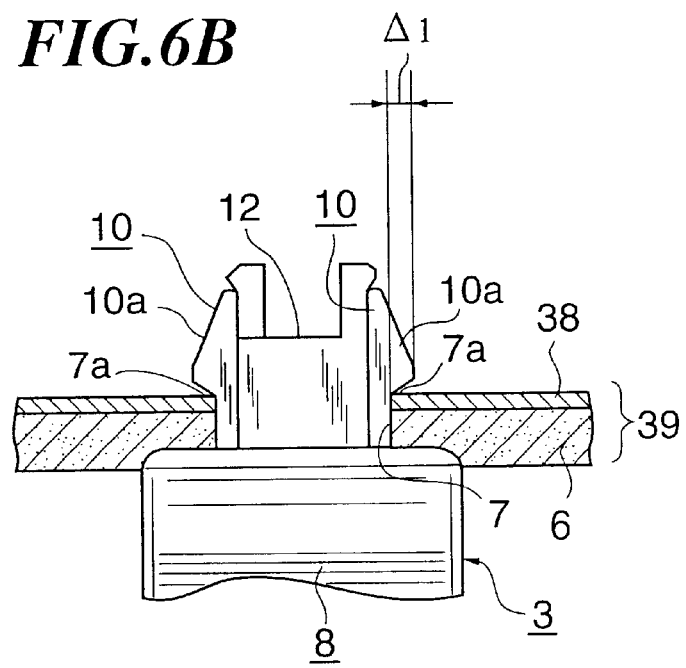
FIG. 6(B) shows the state of final attachment.

In order to finally fix the holder 3 to the wall 39, the cover plate 19 of the holder 3 is closed, with the first and second elastic stoppers 10 and 11 completely inserted in the through-hole 7. The pivoting motion of the cover plate 19 causes the insertion 12 to be fit into the opening 9 of the base 8. As the insertion 12 protrudes into the opening 9, the projections of the contact pieces 16a and 16b push the top portions of the first elastic stoppers 10 outward (in a direction so that the first elastic stoppers 10 are apart from each other), as shown in FIG. 6(B). Consequently, the bottom faces of the inclined projections 10a of the first elastic stoppers 10 come into firm contact with the edges 7a of the through-hole 7. When the insertion 12 is completely inserted into the opening 9, the user feels a click.

Since the rigidity of the first elastic stoppers 10 is relatively large, the inclined projections 10a of the first elastic stoppers 10 can firmly catch the edges 7a of the through-hole 7 under the pressure of the insertion 12. To be more precise, the contact pieces 16a and 16b push the top portions of the first elastic stoppers 10 outward, and prevents the insertion 12 from slipping out of the opening 9. These arrangements allow the holder 3 to be reliably secured to the wall 39 to receive the shaft of the sun visor during the actual use. One of the advantages of this structure is that the first elastic stoppers 10 stand upright from the opening 9 of the base 8 in the free state, and therefore, they are easily inserted into the through-hole 7. The user does not have to deform the first elastic stoppers 10 prior to the insertion. The user simply closes the cover plate 19 to cause the insertion 12 to push the first elastic stoppers 10 outward.

Once the insertion 12 is positioned within the opening 9, the contact projections 16a and 16b continuously push the rear faces of the inclined projections 10 to guarantee the engagement between the first elastic stoppers 10 and the periphery of the through-hole 7. The front stopper 17 is now in frictional contact with the edge 7b of the through-hole, which prevents the holder 3 from moving toward the edge 7b. The frictional contact also contributes to supporting the load applied to the holder 3 when the sun visor 1 is swung about the pivoting shaft.

When removing the holder 3 from the wall 39 for replacement of the roof lining 6 with a new one, the cover plate 19 is opened to pull the insertion 12 but of the opening 9. The first elastic stoppers 10 are released from the firm engagement with the edges 7a, and return to the free state. In the free state, the inclined projections 10a of the first elastic stoppers are now in light contact with the edges 7a of the through-hole 7. The base 8 of the holder 3 is pivoted about one of the edges 7a of the through-hole 7 with the roots of the first and second elastic stoppers acting as fulcrums. Then, the first and second elastic stoppers 10 and 11 on the other side are disengaged from the other edge 7a, and elastically exit from the through-hole 7. Since the wings 15 of the second elastic stoppers 11, which have a larger amount of projection Δ1, are made of a more elastic material, the second elastic stoppers 11 can be pulled out of the through-hole 7 without difficulty. If the first and second elastic stoppers on one side have been disengaged from the associated edge 7a of the through-hole 7, the first and second stoppers on the other side come out of the through-hole 7 easily.

The holder 3 has a hook 13. The thickness of the base 8 of the holder 3 gets thicker near the hook 13. When the cover plate 19 is closed (with the insertion 12 fit into the opening 9 of the base 8), the outer face of the cover plate 19 becomes a part of the inner surface of the hook 13. When the short shaft 26 of the sun visor 1 is moved toward the hook 13, the hook 13 receives the shaft 26 without fail. In the preferred embodiment, a pair of slits 18 are formed in the inner face of the hook 13 along its width so that the area between the two slits 18 elastically bends when receiving the shaft 27. With this arrangement, the hook 13 receives the shaft 26 of the sun visor 1 more easily.

Figure 9:
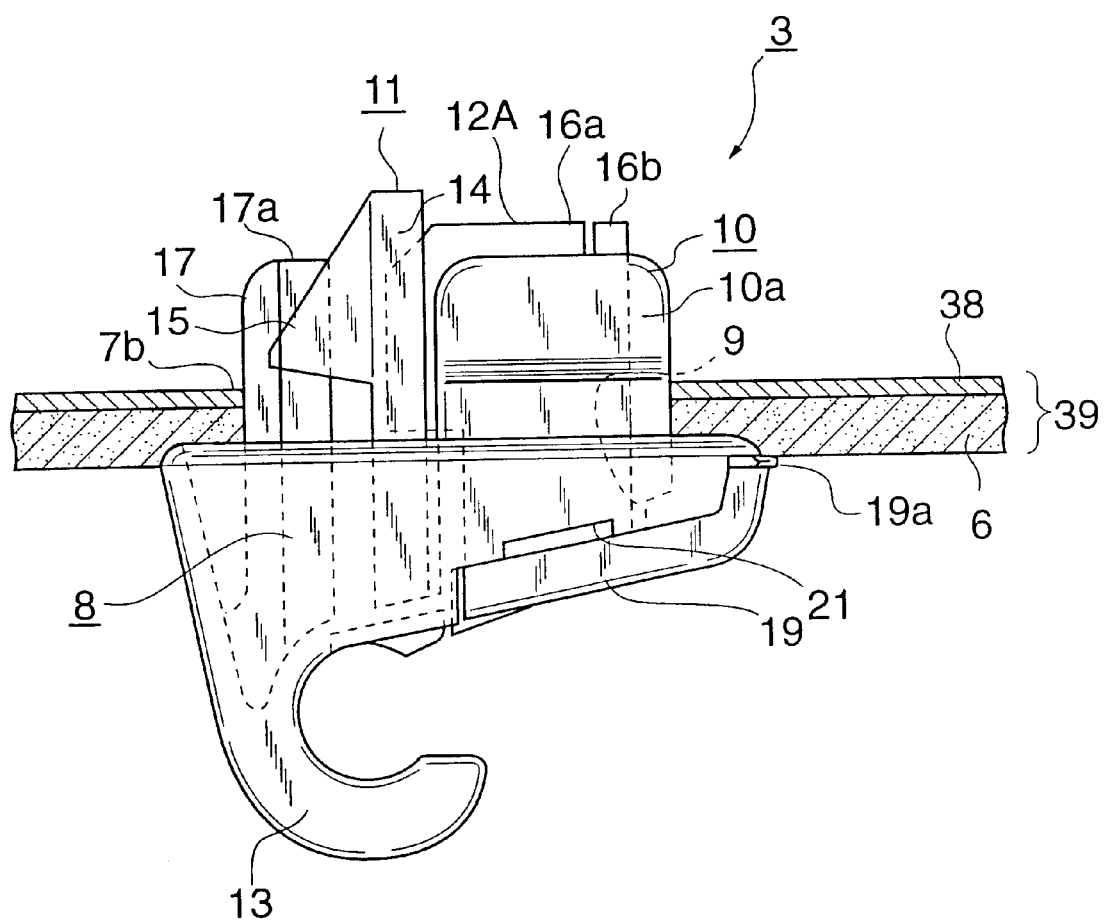
FIG. 9 illustrates a modification of the holder in a side view.
Figure 11A:
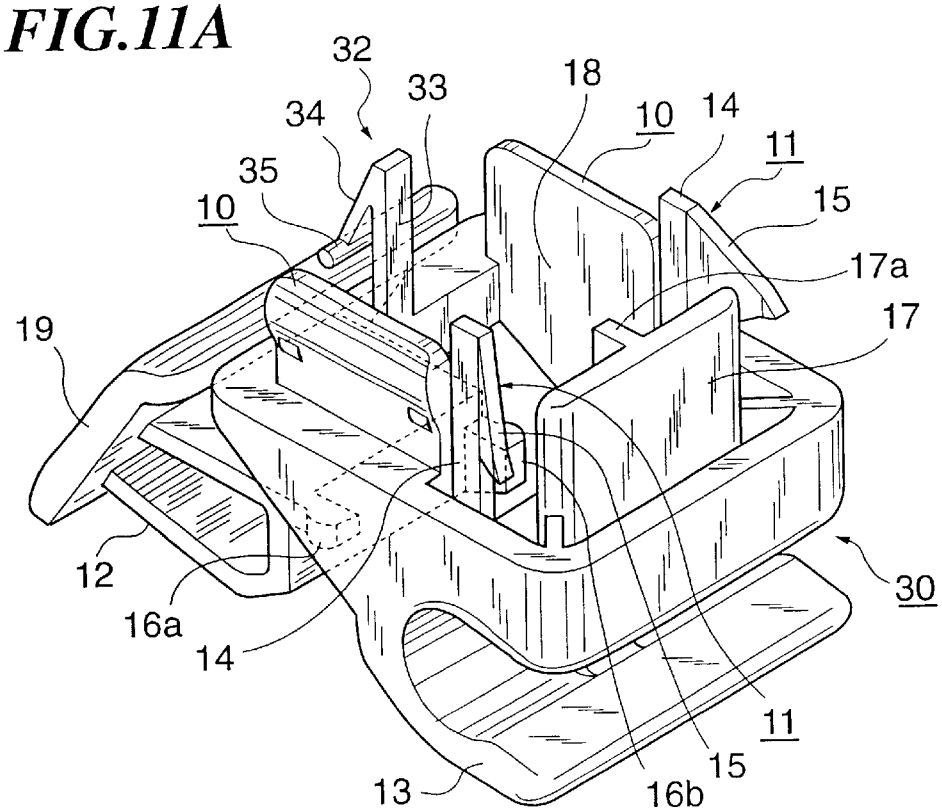
FIG. 11(A) shows the cover plate in the open position.
Figure 11B:
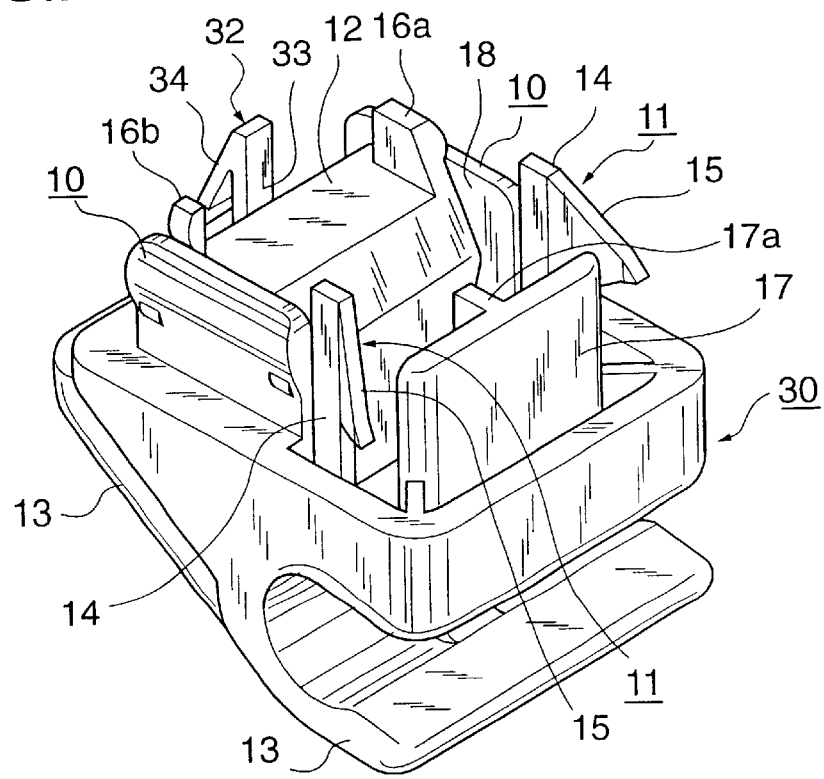
FIG. 11(B) shows the cover plate in the closed position.

When opening the cover plate 19, the tip of a screwdriver (not shown) is inserted in the recess 21 (FIG. 1) formed on the side face of the base 8, in order to separate the contact projections 16a and 16b of the insertion 12 from the first elastic stoppers 10. By slightly pivoting the screwdriver, a gap is made between the cover plate 19 and the base 8. Then, the user can open the cover plate 19 by hand. The recess 21 allows the user to easily open the cover plate 19. In this embodiment, the insertion 12 has such dimensions that it can push the first elastic stopper 10 against the edges 7a of the through-hole 7. However, the size of the insertion 12 may be increased so that the first and second elastic stoppers 10 and 11 are pushed simultaneously, as shown in FIG. 9. In this case, the holder 3 is fixed to the roof lining 6 more securely.

Although, in the embodiment, the second elastic stopper 11 has a single wing 15, two or more wings may be formed. The wing 15 makes an obtuse angle with respect to the leg 14 of the second elastic stopper 11, as shown in FIG. 10(A). However, the wing 15 may be formed so as to make an acute angle with respect to the leg 14, as shown in FIG. 10(B). The configuration shown in FIG. 10(A) is more desirable because the elasticity of the edge of the through-hole 7 increases as it approaches the corner. The through-hole 7 is not necessarily rectangular. It may be an ellipse or an elongated circle. In this case, the outer surfaces of the elastic stoppers 10, 11 and 17 are shaped so as to fit the edge of the through-hole 7.

<Second Embodiment>

FIGS. 11 through 17 illustrate a holder 30 according to the second embodiment of the invention. The same elements as those illustrated in the first embodiment are denoted by the same numerical references, and the explanation for them will be omitted.

In the second embodiment, the cover plate 19 is positioned behind the hook 13. In the actual use, the holder 30 is attached to the roof lining 6 so that the hook 13 faces the interior of a car, and that the cover plate 19 is located next to the front glass. Since the cover plate 19 is hidden behind the hook 13, the appearance of the holder 30 is improved.

Figure 12:
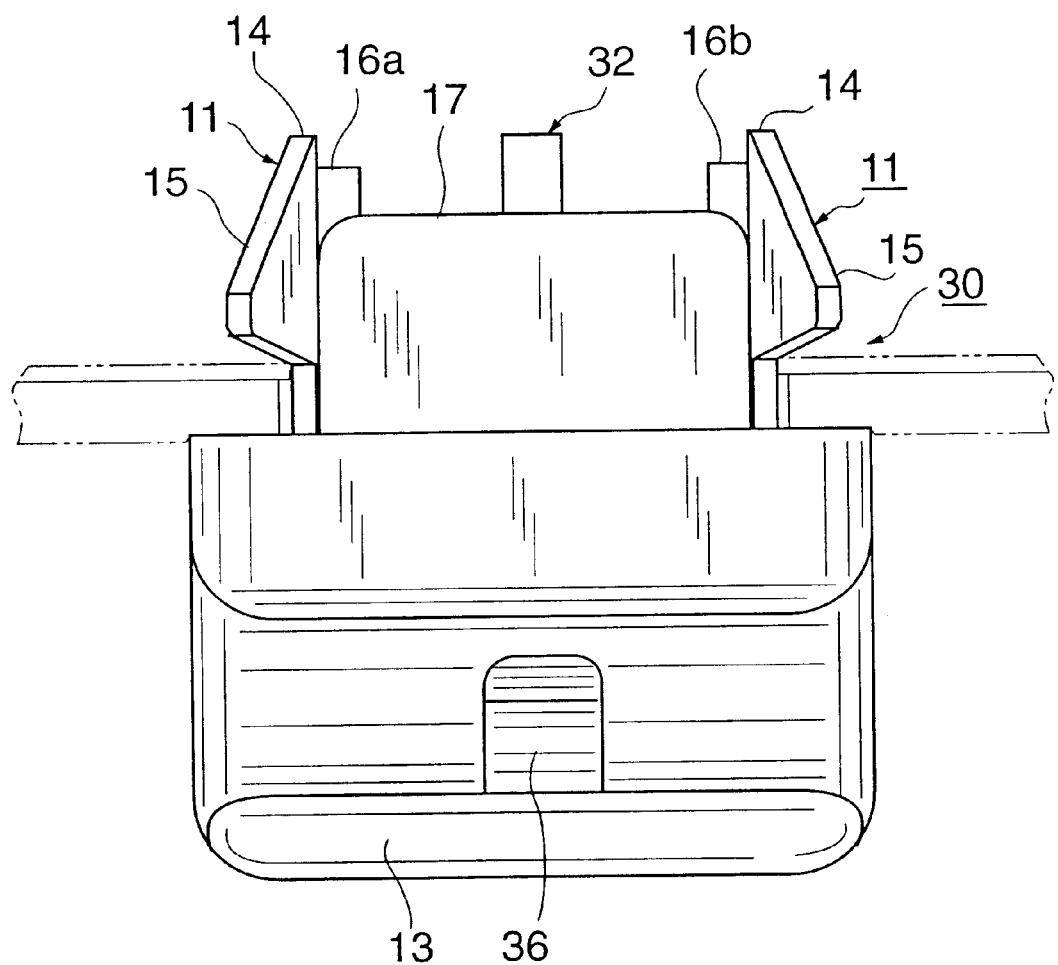
FIG. 12 is a front view of the holder shown in FIG. 11.
Figure 13:
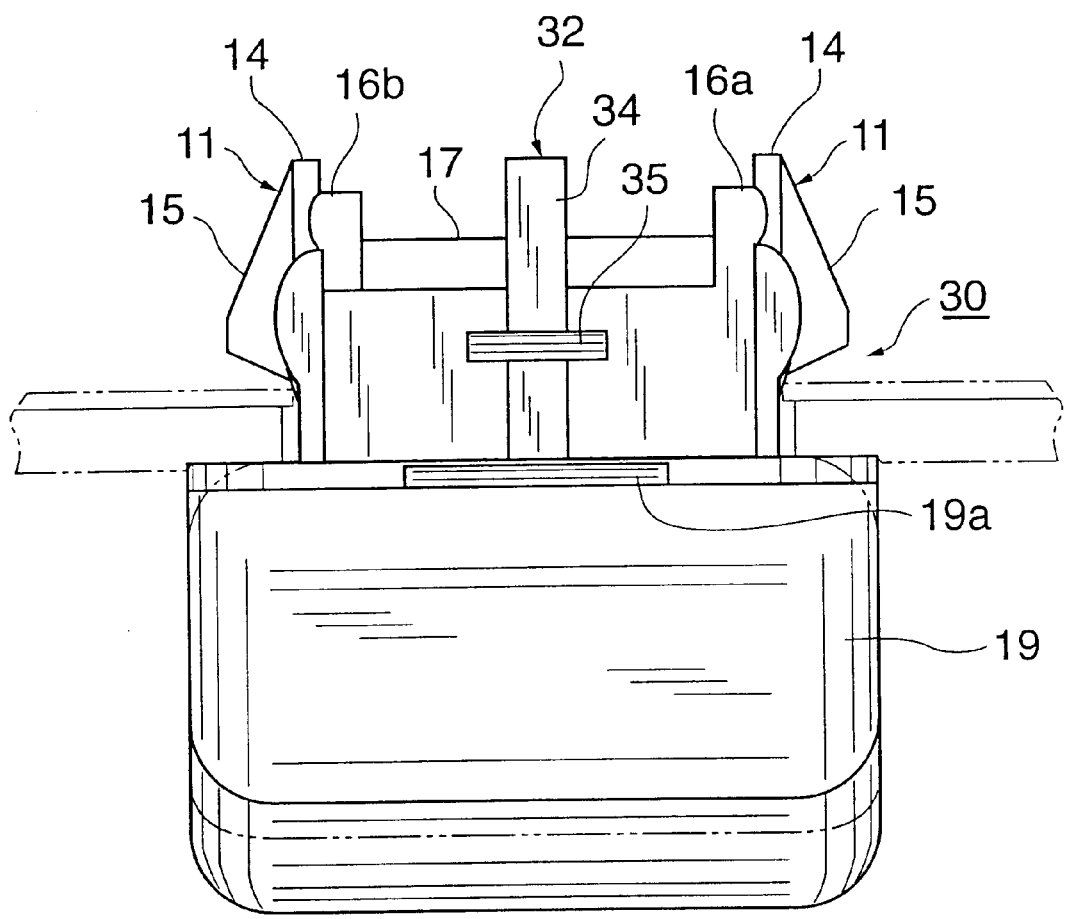
FIG. 13 is a rear view of the holder shown in FIG. 11.

One of the features of the holder 30 is that a temporary stopper 32 is formed between the two first elastic stoppers 10 so as to oppose the front stopper 17. Another feature is that a noise-absorption tongue 36 is provided to the inner face of the hook 13, as shown in FIGS. 12 and 16.

Figure 16A:
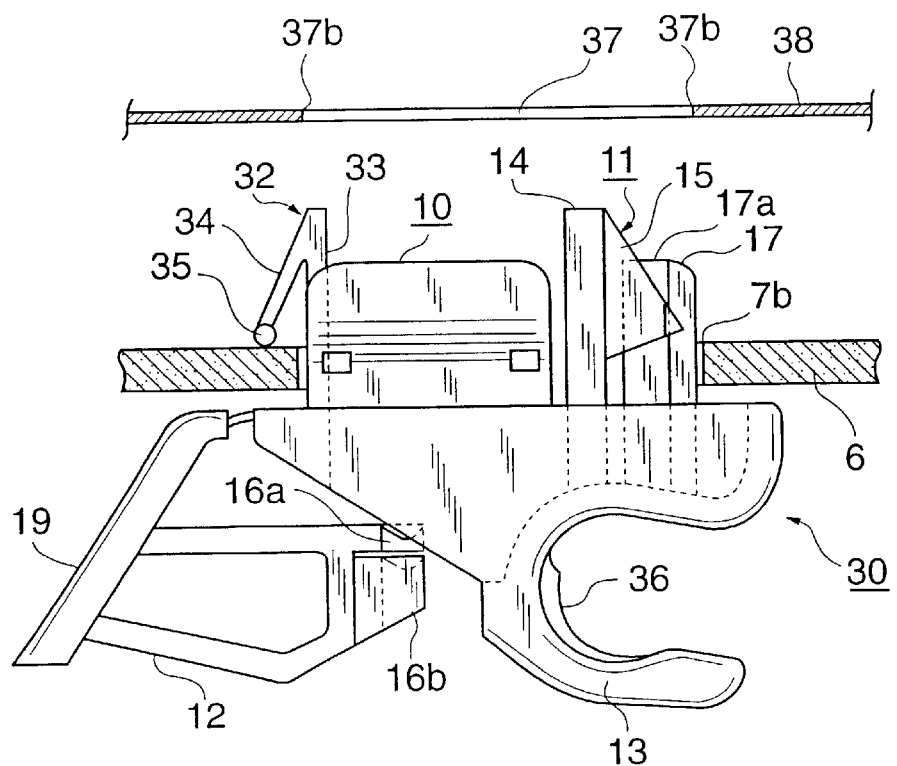
FIG. 16(A) shows the holder immediately before the attachment to the panel board with the cover plate open.

The temporary stopper 32 comprises a leg 33 standing upright from the top face of the base 8, an arrow 34 extending downward obliquely from the tip of the leg 33, and a stopper piece 35 extending horizontally at the bottom end of the arrow 34. If the holder 30 is attached to the roof lining 6, which is made of soft material, the stopper piece 35 elastically catches the inner surface of the roof lining 6, as shown in FIG. 16(A). The elastic engagement of the stopper piece 35 with the roof lining 6 improves the reliability of assembling the holder 30 and the roof lining 6 into a single unit for shipping.

Figure 16B:
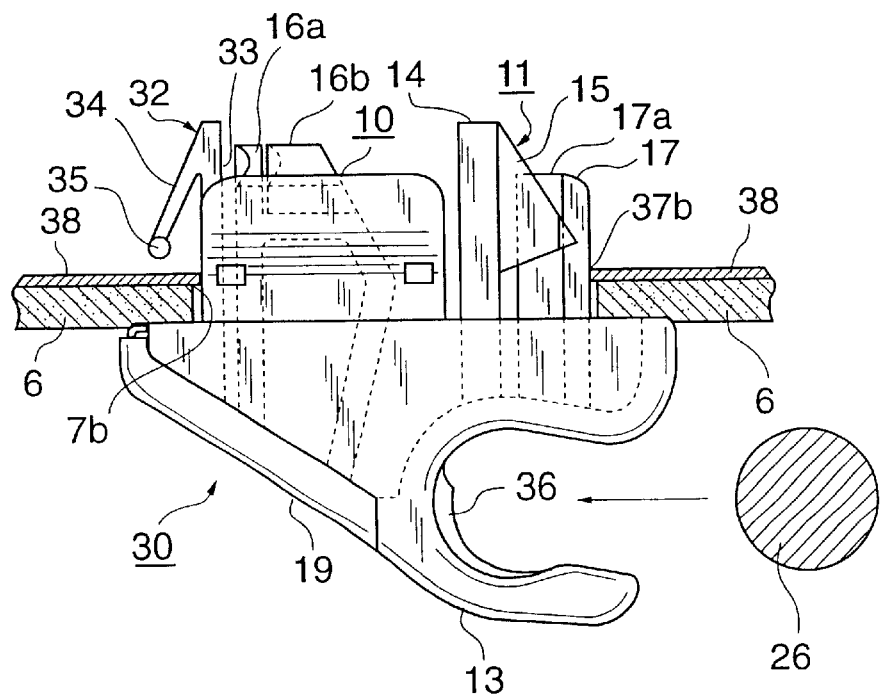
FIG. 16(B) shows the final attachment of the holder with the cover plate closed.
Figure 17A:
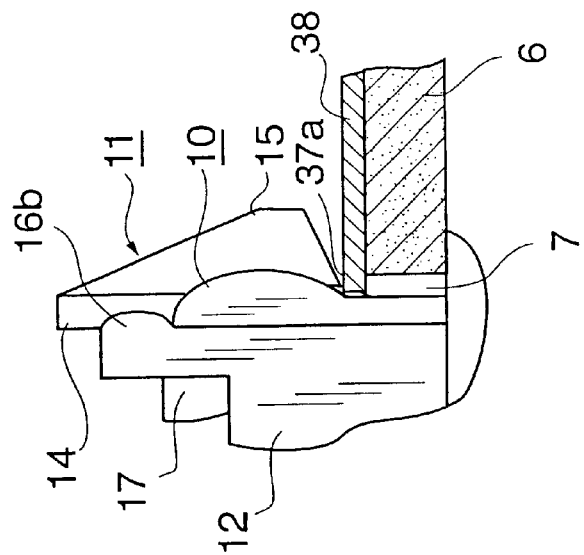
FIG. 17(A) shows the elastic stoppers that are going to be inserted into the through-hole.
Figure 17B:
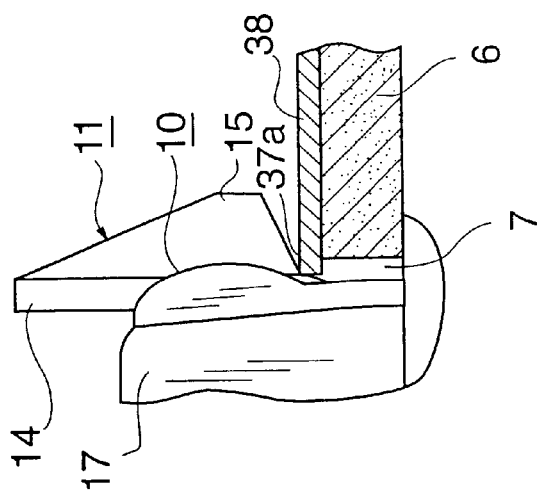
FIG. 17(B) shows the elastic stoppers in temporary contact with the edges of the through-hole.

FIGS. 16 and 17 illustrate how the roof lining 6 with the holder 30 is attached to the ceiling panel 38 of the car. First, the fastening structure of the holder 30 is inserted into the through hole 37 of the ceiling panel 38 until the roof lining 6 touches the ceiling panel 38, as shown in FIGS. 17(A) and 17(B). During the insertion, the cover plate 19 is open, as shown in FIG. 16(A). The stopper piece 35 of the temporary stopper 32 is elastically deformed toward the leg 33, and inserted into the through-hole 37 without requiring much force.

Figure 14:
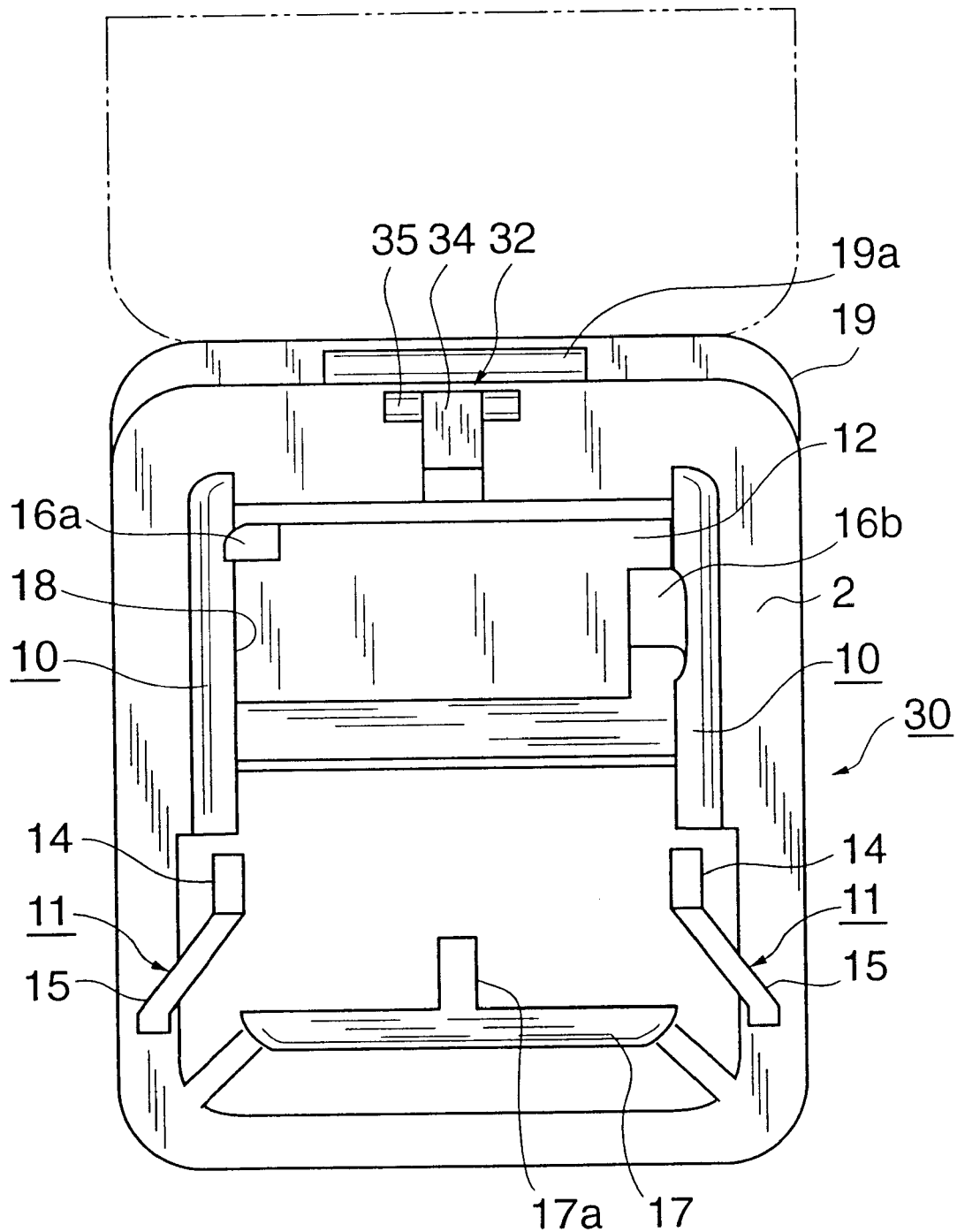
FIG. 14 is a plan view of the holder shown in FIG. 11.
Figure 15:
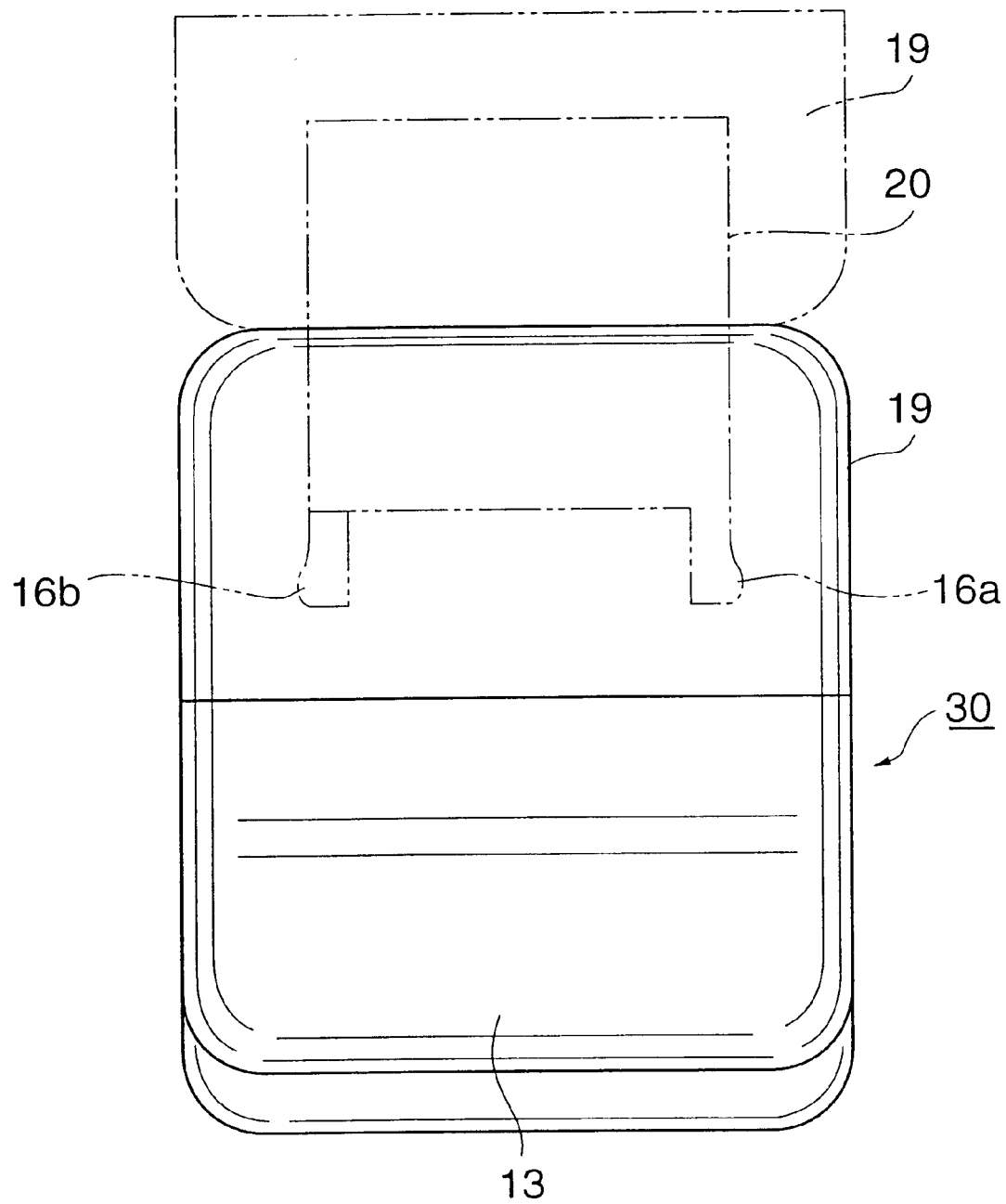
FIG. 15 is a bottom view of the holder shown in FIG. 11.
Figure 17C:
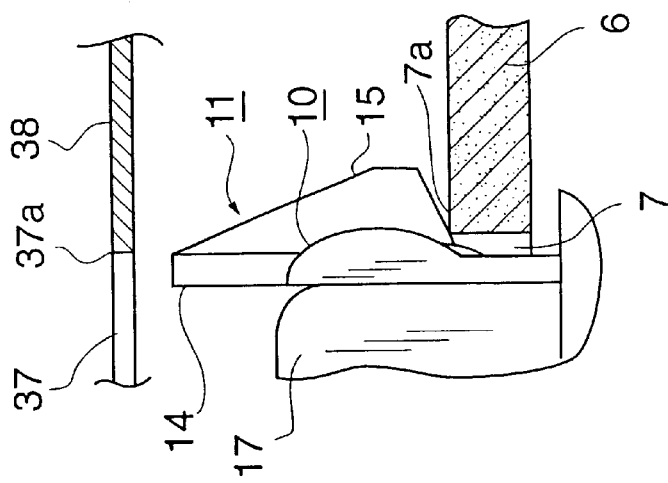
FIG. 17(C) shows the elastic stoppers in final contact with the edges of the through-hole.

Then, the cover plate 19 is closed, as shown in FIGS. 16(B). The insertion 12 formed in the inner face of the cover plate 19 is now inserted within the opening 9 of the base 8. The outer surface of the cover plate 19 becomes a part of the holder 30, as shown in FIG. 15. The insertion 12 pushes the first elastic stoppers 10 outward to bring them into firm contact with the ceiling panel, as shown in FIGS. 14 and 17(C). In this state, the front stopper 17 is in frictional contact with the edge 37b of the through-hole 37 of the ceiling panel 38.

The hook 13 of the holder 30 receives the shaft 26 of the sun visor 1, as shown in FIG. 16(B). Since the noise-absorption tongue 36 is provided to the inner face of the hook 13, it does not make an uncomfortable noise when receiving the shaft 24.

<Third Embodiment>

Figure 18:
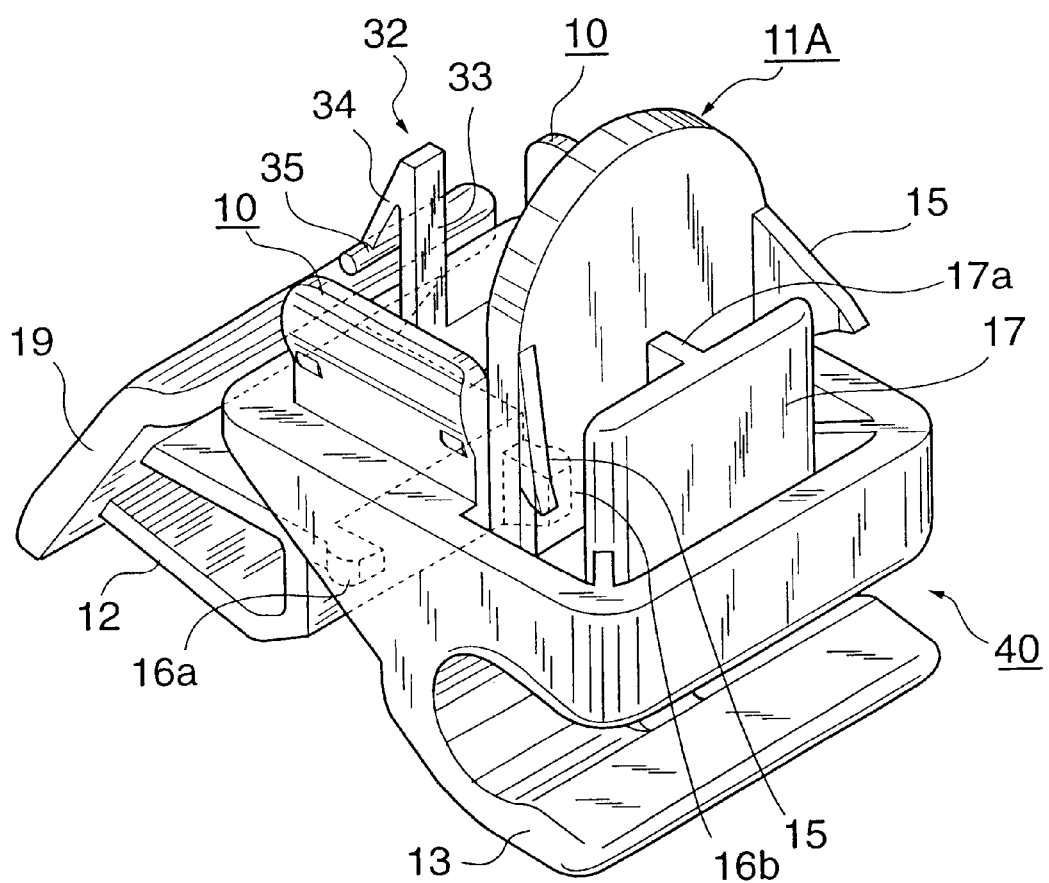
FIG. 18 illustrates the holder according to the third embodiment of the invention.
Figure 19:
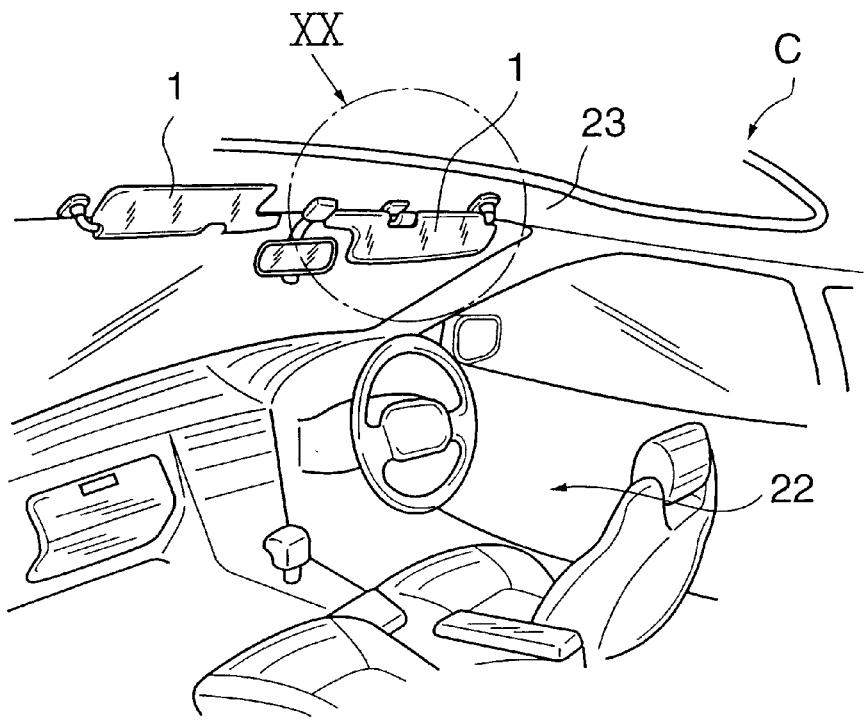
FIG. 19 illustrates the interior of an automobile.

FIG. 18 illustrates the holder 40 according to the third embodiment of the invention. The same elements as those shown in the first and second embodiments are denoted by the same numerical references, and the explanation for them will be omitted.

The holder has an arched plate 11A, which connects the legs 14 of the second elastic stoppers 11 behind the front stopper 17. The top end of the plate 11A forms an arc. The triangle wings 15 extend from the both sides of the plate 11A, spreading outward not parallel to each other, so that the bottom faces of the wings 15 catch the edges of the through-hole 7.

The width of the arched plate 11A is substantially the same as the width of the through-hole 7. The arched plate 11A functions as a guide when the fastening structure of the holder 40 is inserted into the through-hole 7, which makes attachment of the holder 40 easier.

The cover plate 19 is located behind the hook 13, as in the second embodiment. As the cover plate 19 is closed, the insertion 12 protrudes into the opening 9 behind the arched plate 11A, and the contact projections 16a and 16b push the first elastic stoppers 10 outward.

As has been described above, the holders according to the present invention allow easy attachment and easy removal to and from a wall or the like, without requiring much force. The holder can be temporarily or finally attached to the wall, depending on the particular situation. To temporarily attach the holder to a wall, the user simply inserts the fastening structure of the holder into a through-hole formed on the wall, with the cover plate open. To finally fix the holder, the user closes the cover plate. Since the insertion formed to the inner face of the cover plate pushes at least the first elastic stoppers outward as the cover plate is closed, firm engagement between the stoppers and the edges of the through-hole is achieved.

In order to detach the holder from the wall, the cover plate is opened to pull the insertion out of the opening of the base. The first elastic stoppers return to the regular position, which allows the user to easily detach the holder from the wall. The easy removal, in conjunction with the two-stage attachment (i.e., temporary and final attachment), is practically useful because assembling a holder and a roof lining in a single unit is promoted.

The front stopper can prevent the holder from shifting along the longitudinal axis of the through-hole. By placing the cover plate behind the hook, the appearance of the holder is improved when the holder is actually attached to the interior of a car. An arched plate for connecting the second elastic stoppers functions as a guide when the fastening structure is inserted in the through-hole, thereby facilitating the insertion.

It should be noted that, besides those embodiments mentioned above, many modifications and variations may be made without departing from the novel and advantageous features of the present invention. The fastening structure described above can be applied to many other types of holders, retainers, articles, etc. Accordingly, all such modifications and variations are intended to be included within the scope of the appended claims.

What is claimed is:

1. A fastening structure for fixing an article onto a board via a through-hole formed thereon, the fastening structure comprising:

a base having a top face, side faces opposed to each other, and a rear end;

an opening formed in the base, the opening having at least two opposing edges;

a pair of first elastic stoppers standing upright from the top face of the base so as to oppose to each other and positioned along the edges of the opening, each first elastic stopper having an inclined projection extending outward;

a pair of second elastic stoppers standing upright from the top face of the base and positioned next to the first elastic stoppers, each second elastic stopper having a leg and a wing extending from the leg, the wings spreading outward so as not to be parallel to each other;

a cover plate attached to the rear end of the base in a pivotable manner, the cover plate swinging between an open position and a closed position; and an insertion extending from an inner surface of the cover plate, the insertion being fit into the opening of the base and pushing at least the first elastic stoppers outward when the cover plate is closed.

2. The fastening structure according to claim 1, wherein the cover plate becomes a part of the bottom face of the base when the cover plate is closed.

3. The fastening structure according to claim 1, further comprising recesses formed on the side faces of the base, each recess extending inward and communicating with the opening.

4. The fastening structure according to claim 1, further comprising a front stopper standing upright from the top face of the base, the front stopper being substantially perpendicular to the first and second elastic stoppers.

5. The fastening structure according to claim 4, further comprising a temporary stopper consisting of a leg, an arrow extending obliquely downward from the top of the leg, and a stopper piece extending horizontally at the tip of the lower end of the arrow.

6. The fastening structure according to claim 1, further comprising an arched plate connecting the legs of the second elastic stoppers.

7. The fastening structure according to claim 1, wherein the insertion has contact pieces, each contact piece pushing the associated first elastic stopper outward when the cover plate is closed.

8. The fastening structure according to claim 1, wherein the second elastic stoppers are positioned along the edges of the opening next to the first elastic stoppers, and the insertion pushes both the first and second elastic stoppers when the cover plate is closed.

9. The fastening structure according to claim 1, wherein the second elastic stoppers are more elastic than the first elastic stoppers.

10. The fastening structure according to claim 1, wherein the lap of the wing of the second elastic stopper is greater than a lap of the inclined projection of the first elastic stopper.

11. The fastening structure according to claim 1, wherein the wing of the second elastic stopper makes an acute angle with respect to its leg.

12. The fastening structure according to claim 1, wherein the wing of the second elastic stopper make an obtuse angle with respect to its leg.

13. The fastening structure according to claim 1, wherein the edges of the opening are substantially straight so that the opening is rectangular.

14. The fastening structure according to claim 1, wherein the through-hole formed on the board is a rectangular hole defined by longer edges and shorter edges, and the inclined projections of the first elastic stoppers catch the longer edges of the through-hole when the fastening structure is inserted into the through-hole.

15. The fastening structure according to claim 14, wherein the insertion has contact pieces, and the contact pieces push the pair of first elastic stoppers outward when the cover plate is closed, so that the inclined projection of the first elastic stoppers come into firm contact with the longer edges of the through-hole.

16. The fastening structure according to claim 14, further comprising a front stopper, and wherein the front stopper comes into contact with a shorter edge of the though-hole when the fastening structure is inserted in the through-hole.

17. A holder with a fastening structure comprising;

a base having a top face, side faces opposed to each other, and a rear end;

a hook extending from the base and curling in a direction opposite to the top face of the base;

a cover plate attached to the rear end of the base in a pivotable manner, the cover plate swinging between an open position and a closed position, an opening formed in the base, the opening being defined by at least two edges;

a pair of first elastic stoppers standing upright from the top face of the base and positioned along the edges of the opening, each first elastic stopper having an inclined projection extending outward;

a pair of second elastic stoppers standing upright from the top face of the base and positioned next to the first elastic stoppers, each second elastic stopper having a leg and a wing extending from the leg, the wings spreading outward so as not to be parallel to each other; and an insertion extending from an inner surface of the cover plate, the insertion being fit into the opening of the base and pushing at least the first elastic stoppers outward when the cover plate is closed.

18. The holder with a fastening structure according to claim 17, wherein the cover plate smoothly connects with the inner surface of the hook when the cover plate is closed.

19. The holder with a fastening structure according to claim 17, wherein the cover plate is located behind the hook, and the cover plate smoothly connects with an outer surface of the hook when the cover plate is closed.

20. The holder with a fastening structure according to claim 17, further comprising a noise-absorption tongue that is provided on the inner surface of the hook.

21. The holder with a fastening structure according to claim 17, wherein the insertion has contact pieces, and the contact pieces push the first elastic stoppers outward when the cover plate is closed.

22. The holder with a fastening structure according to claim 17, wherein the fastening structure of the holder is inserted in a through-hole formed in a supporting material on which the holder is attached; and wherein the holder has a temporary attachment mode, in which the holder is temporarily attached to the supporting material with the cover plate open, and a final attachment mode, in which the holder is finally attached to the supporting material with the cover plate closed.

23. The holder with a fastening structure according to claim 22, wherein the inclined projections of the first elastic stoppers are in light contact with the edges of the through-hole in the temporary attachment mode, and in firm contact with the edges of the through-hole in the final attachment mode under the pressure of the insertion.

24. A roof lining with a holder comprising;

a lining having a through-hole; and a holder attached to the lining via the through-hole, the holder having a fastening structure that comprises:

a base having a top face, side faces opposed to each other, and a rear end;

an opening formed in the base, the opening being defined by at least two edges;

a pair of first elastic stoppers standing upright from the top face of the base and positioned along the edges of the opening, each first elastic stopper having an inclined projection extending outward;

a pair of second elastic stoppers standing upright from the top face of the base and positioned next to the first elastic stoppers, each second elastic stopper having a leg and a wing extending from the leg, the wings spreading outward so as not to be parallel to each other;

a cover plate attached to the rear end of the base in a pivotable manner, the cover plate swinging between an open position and a closed position; and an insertion extending from the inner surface of the cover plate, the insertion being fit into the opening of the base and pushing at least the first elastic stoppers outward when the cover plate is closed.

25. The roof lining with a holder according to claim 24, wherein the holder is attached to the lining with the cover plate open.

26. The roof lining with a holder according to claim 24, wherein the cover plate is closed when the roof lining with a holder is finally fixed to a panel board.

\* \* \* \* \*